US008064948B2

(12) United States Patent
Meier et al.

(10) Patent No.: US 8,064,948 B2
(45) Date of Patent: Nov. 22, 2011

(54) SEAMLESS ROAMING FOR DUAL-MODE WIMAX/WIFI STATIONS

(75) Inventors: Robert Charles Meier, Cuyahoga Falls, OH (US); Keith Kenneth Dettloff, Burbank, CA (US); John Gary Waclawsky, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 1004 days.

(21) Appl. No.: 11/328,756

(22) Filed: Jan. 9, 2006

(65) Prior Publication Data

US 2007/0160017 A1 Jul. 12, 2007

(51) Int. Cl.
*H04M 1/00* (2006.01)
*H04W 36/00* (2009.01)

(52) U.S. Cl. .................................. 455/552.1; 455/436
(58) Field of Classification Search ............... 455/552.1, 455/436
See application file for complete search history.

(56) References Cited

U.S. PATENT DOCUMENTS

| | | | |
|---|---|---|---|
| 6,256,300 B1* | 7/2001 | Ahmed et al. ................ | 370/331 |
| 6,490,259 B1 | 12/2002 | Agrawal et al. | |
| 6,587,680 B1* | 7/2003 | Ala-Laurila et al. .......... | 455/411 |
| 6,954,643 B2 | 10/2005 | Petrus | |
| 2002/0085540 A1 | 7/2002 | Hyvarinen et al. | |
| 2002/0142771 A1 | 10/2002 | Saifullah et al. | |
| 2003/0223450 A1* | 12/2003 | Bender et al. ................ | 370/441 |
| 2003/0224784 A1* | 12/2003 | Hunt et al. ................ | 455/426.2 |
| 2004/0030791 A1* | 2/2004 | Dorenbosch et al. ......... | 709/230 |
| 2004/0151136 A1* | 8/2004 | Gage ............................. | 370/328 |
| 2004/0219948 A1 | 11/2004 | Jones et al. | |
| 2005/0068929 A1 | 3/2005 | Chang et al. | |
| 2005/0078636 A1 | 4/2005 | Zhang et al. | |
| 2005/0129029 A1 | 6/2005 | Creamer et al. | |
| 2005/0130661 A1 | 6/2005 | Aerrabotu et al. | |
| 2005/0149718 A1* | 7/2005 | Berlin ......................... | 713/151 |
| 2005/0202849 A1* | 9/2005 | Ignatin ....................... | 455/564 |
| 2005/0239498 A1 | 10/2005 | Dorenbosch et al. | |
| 2005/0288019 A1* | 12/2005 | Park et al. .................... | 455/436 |
| 2006/0120329 A1* | 6/2006 | Kim et al. ................... | 370/331 |
| 2007/0064647 A1* | 3/2007 | Prasad ........................ | 370/331 |
| 2007/0177629 A1* | 8/2007 | Yegin ......................... | 370/469 |
| 2008/0130572 A1* | 6/2008 | Zhang et al. ................ | 370/331 |

FOREIGN PATENT DOCUMENTS

EP 1047279 A2 * 10/2000

OTHER PUBLICATIONS

State Intellectual Property Office of the People's Republic of China, Chinese Office Action and English Translation of Text of the First Office Action—Application No. 200780002081.7, Ser. No. 2011012800221530; (17 pages), Feb. 1, 2011.

* cited by examiner

*Primary Examiner* — Marisol Figueroa
(74) *Attorney, Agent, or Firm* — Baker Botts L.L.P.

(57) ABSTRACT

An exemplary embodiment providing for one or more improvements includes a method for use in a mobile station operating in a multi-protocol wireless network environment that supports a first wireless communication protocol and a second wireless communication protocol wherein the network environment allows the mobile station to seamlessly roam utilizing the first and second wireless communication protocols. The method includes establishing a first link layer connection using the first wireless communication protocol; and establishing a second link layer connection using the second wireless communication protocol wherein a single mobile identifier, corresponding to the mobile station, is used in the first and second connections.

16 Claims, 10 Drawing Sheets

SEAMLESS ROAMING FOR DUAL-MODE WIMAX/WIFI STATIONS

BACKGROUND

In recent years, the existence of short-range 802.11 or "WiFi" networks have become wide-spread due to the various advantages provided by a wireless connection. However, these short-range networks are just that—short-range. As a result, a mobile user will typically be required to connect to another available WiFi network as he or she roams. This can be problematic, though, as typically there may be dead zones where no WiFi network is available. Additionally, a mobile user usually can not easily roam from one WiFi network to another due to a need to obtain new credentials for each WiFi network and possible equipment/protocol incompatibilities.

In view the aforementioned shortcomings of short-range WiFi networks, long-range WiMax networks are beginning to be installed in select urban environments. The mobile WiMax variant, also sometimes referred to as 802.16e in reference to the IEEE standard, typically can cover much larger geographic areas than the typical WiFi network. As a result, a user can roam for larger distances without losing his or her connection as compared to a WiFi connection. However, it may still be possible to encounter a dead zone if the user goes out of range. Additionally, the user may also be required to connect to a different WiMax zone if he travels out of range of the WiMax zone to which he is currently connected. Finally, it can sometimes be preferable to be connected to a WiFi network, when one is in range, as opposed to an available WiMax network, because a WiFi network will typically provide a higher data connectivity speed.

In view of the foregoing, it may be beneficial to provide methods and systems that would allow a dual-mode (e.g. WiMax/WiFi) mobile station to seamlessly roam in a multi-protocol wireless environment to minimize possible disruptions and increase Quality of Server (QoS) associated with one or more network applications. It may additionally be beneficial to provide methods and systems to preferentially connect to a short-range WiFi network when available.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
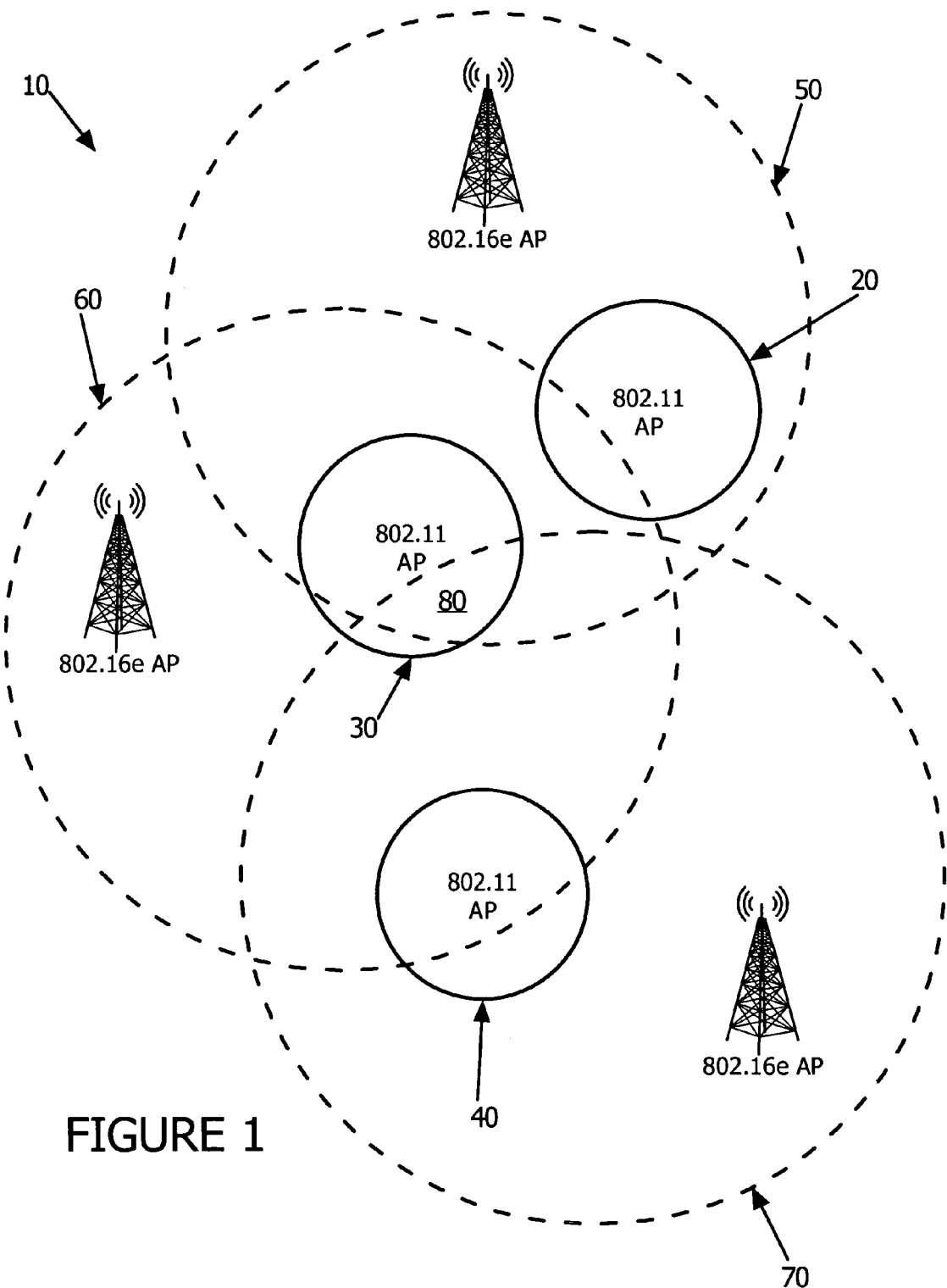
FIG. 1 illustrates a multi-protocol wireless network topography, in accordance with an exemplary embodiment.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated, while other embodiments are directed to other improvements.

An embodiment by way of non-limiting example discloses a method for use in a mobile station operating in a multi-protocol wireless network environment that supports a first wireless communication protocol and a second wireless communication protocol wherein the network environment allows the mobile station to seamlessly roam utilizing the first and second wireless communication protocols. The method includes establishing a first link layer connection using the first wireless communication protocol; and establishing a second link layer connection using the second wireless communication protocol wherein a single mobile identifier, corresponding to the mobile station, is used in the first and second connections.

Another embodiment by way of non-limiting example discloses a method for use in a mobile station operating in a multi-protocol wireless network environment that supports a first wireless communication protocol and a second wireless communication protocol wherein the network environment allows the mobile station to seamlessly roam utilizing the first and second wireless communication protocols. The method includes establishing a link layer connection of either of the first or second protocols and verifying that the link layer connection is of a preferred wireless communication protocol of the first or second protocols. Availability of a second link layer connection of the preferred wireless communication protocol is then checked if the link layer connection is not of the preferred wireless communication protocol and establishing a link layer connection of the preferred wireless communication protocol if available.

Yet another embodiment by way of non-limiting example discloses a mobile station operable to establish a first link layer connection of a first wireless communication protocol and a second link layer connection of a second wireless communication protocol. The mobile station includes a first wireless network interface corresponding to the first wireless communication protocol, a second wireless network interface corresponding to the second wireless communication protocol, a memory and one or more processors. Also included is a first wireless network interface driver, stored in the memory, that comprises instructions operative to cause the first wireless network interface and the processor to establish the first link layer connection of the first wireless communication protocol, a second wireless network interface driver, stored in the memory, that comprises instructions operative to cause the second wireless network interface and the processor to establish the second link layer connection of the second wireless communication protocol. In one implementation, the mobile station further comprises a common network interface layer, stored in the memory, that is operative to present a common link layer interface to higher layers of the protocol stack, and is further operative to switch between the first and second wireless network interfaces for communication, and one or more translation layers operative to translate between the first wireless communication protocol and the common network interface layer and further operative to translate between the second wireless communication protocol and the common network interface layer.

In the context of the claimed embodiments, it should be understood that certain terms and various combinations of those terms can be used interchangeably. For example "WiFi" and "short-range" refer to wireless communications over a somewhat limited geographical range (relative to a long-range wireless communication protocol) and can be of a protocol such as that defined in the IEEE 802.11 standard. Similarly, "WiMax" and "long-range" refer to wireless communications over a wider geographical range than what a short-range protocol is typically capable of and could perhaps be of a protocol such as that defined in the IEEE 802.16e standard. It will also be appreciated that the claimed embodiments are not limited to either the IEEE 802.11 or the 802.16e wireless communication protocols. Additionally, "wireless client", "mobile station" and "mobile node" can all be used interchangeably and refer to a mobile device capable of supporting wireless communications. Still further, the invention can be used in a multi-protocol environment where both wireless protocols implemented on the mobile station are either short-range or long-range protocols. In a similar vein, the next several paragraphs will highlight several aspects of wireless networking standards.

A WiMax 802.16e base station is analogous to a WiFi 802.11 access point. The phrase "access point" can be used to refer to either a WiFi 802.11 access point or a WiMax 802.16e base station.

Radio ports of WiFi and WiMax access points are identified by an 802 address. The 802 address that identifies a WiMax access point radio port is termed a BSID in the 802.16 draft standard. The 802 address that identifies a WiFi access point radio port is termed a BSSID in the 802.11 standard. Herein, an APRRID is an 802 address that is either a WiFi access point BSSID or a WiMax access point BSID.

A WiMax 802.16e Mobile Subscriber Station (MSS) is analogous to a WiFi 802.11 non-access point "client" station. In this disclosure, the phrase mobile node refers to either an 802.16e MSS or 802.11 client station. A mobile node is identified by an 802 address.

An 802.11 Traffic Stream corresponds to an 802.16e Service Flow. In this document, the phrase QoS Stream refers to a high-priority 802.11 or 802.16e uplink or downlink traffic stream.

A typical network topography for which aspects of the claimed embodiments can be practiced will now be presented. FIG. 1 illustrates a multi-protocol wireless network topography 10, in accordance with an exemplary embodiment. Included in topography 10 are multiple short-range WiFi access point (AP) coverage areas (20, 30 and 40) and multiple long-range WiMax AP coverage areas (50, 60 and 70). To further differentiate between the short-range and the long-range AP coverage areas, dashed-lined circles are used for the long-range AP coverage areas and solid-lined circles are utilized for the short-range AP coverage areas. Additionally, the boundaries of each circle are generally indicative of the range for each AP coverage area. That is, a WiMax access point will usually have a larger coverage area as compared to a WiFi access point. However, the dimensions of the coverage areas of FIG. 1 are not meant to imply any further limitations as a variety of factors can affect the range of any particular access point. It should also be further noted that while FIG. 1 indicates that the access points (20, 30 and 40) utilize an 802.11-type short-range protocol and that the long-range AP coverage area (50, 60 and 70) utilize an 802.16e-type long-range protocol, it will be seen that the claimed embodiments are not limited to these two wireless communication protocols.

In further reference to FIG. 1, it is evident that the various AP coverage areas overlap each other and that the short-range AP coverage areas (20, 30 and 40) have a smaller range as compared to the long-range AP coverage areas (50, 60 and 70). As a result, a mobile user (not shown) would need to connect to another AP coverage area when he travels out of range of the AP coverage area to which it is currently connected. For example, a mobile user may be connected (through their mobile station) to long-range AP coverage area 70 and then the mobile user moves out of range by going over to WiFi AP coverage area 20. Upon entering WiFi AP coverage area 20, the mobile user makes a new connection. In subsequent sections, it will be shown how a mobile station of the mobile user can seamlessly roam from AP coverage area to AP coverage area without requiring intervention from the user to stay connected or substantial disruption of real-time or other network applications.

It will also be shown how a mobile station can preferentially stay connected to a short-range AP coverage area when other long-range AP coverage areas are available to establish a connection. For example, short-range AP coverage area 30 is completely contained with sections of long-range AP coverage areas 50, 60 and 70. As can be seen, a mobile station (not shown) located within short-range AP coverage area 30 has at least two connection options and potentially up to four connection options where AP coverage areas 30, 50, 60 and 70 all intersect in region 80. In this sort of situation, it is usually preferable to stay connected to short-range AP coverage area 30 as short-range AP coverage areas will usually provide better service as compared to a long-range AP coverage area.

The network topography 10 of FIG. 1 is suitable for any multi-protocol wireless environment. For example, network topography 10, of FIG. 1 could be implemented as a wireless metropolitan area network (WMAN) and can typically include the following components: an Ethernet/IP network infrastructure, a wireless location register (WLR), one or more wireless domain servers (WDS), short-range access points, long-range access points, dual-mode short-range/long-range mobile stations and virtual home subnets wherein each mobile station could be bound to a virtual home subnet. It will be appreciated that various components, in the preceding list, can be removed or other components can be added according to various differing implementations of a WMAN.

A WMAN is used to facilitate seamless mobile roaming. This can be accomplished by grouping various access points into wireless domains, which are controlled by a WLR. In other words, logical wireless (e.g., WLCCP) infrastructure nodes are organized into a base network "tree topology", for control purposes. In a network with multiple wireless domains, the WLR is at the root of the tree topology. As noted above, access points are grouped into a wireless domain controlled by a WDS. A wireless domain may contain an arbitrary mix of long-range/WiMax and short-range/WiFi access points.

In the WMAN, long-range access points may provide an "umbrella network" that spans an entire metropolitan area and short-range access points provide high-speed "overlay" 802.11-type radio coverage in select, relatively small, hotspot areas. The short-range access points greatly increase the total available bandwidth. Much of the increase in the total available bandwidth is possible because low-power, short-range access points, which are typically separated by a relatively short distance, can communicate concurrently on the same radio channel.

Also in the WMAN, a logical long-range or a logical short-range access point may exist in a separate device or a logical access point may exist as a port-level software entity in a wireless controller. In some short-range networks, for example, "lightweight" access points could perhaps be attached to a wireless controller, with short-range MAC protocol functions split between a lightweight access point and a software entity in a wireless switch. Also, a single physical device may contain multiple logical wireless LAN context control protocol (WLCCP) infrastructure nodes. For example, a wireless controller device may contain a logical WDS and one or more logical access points.

Figure 2A:
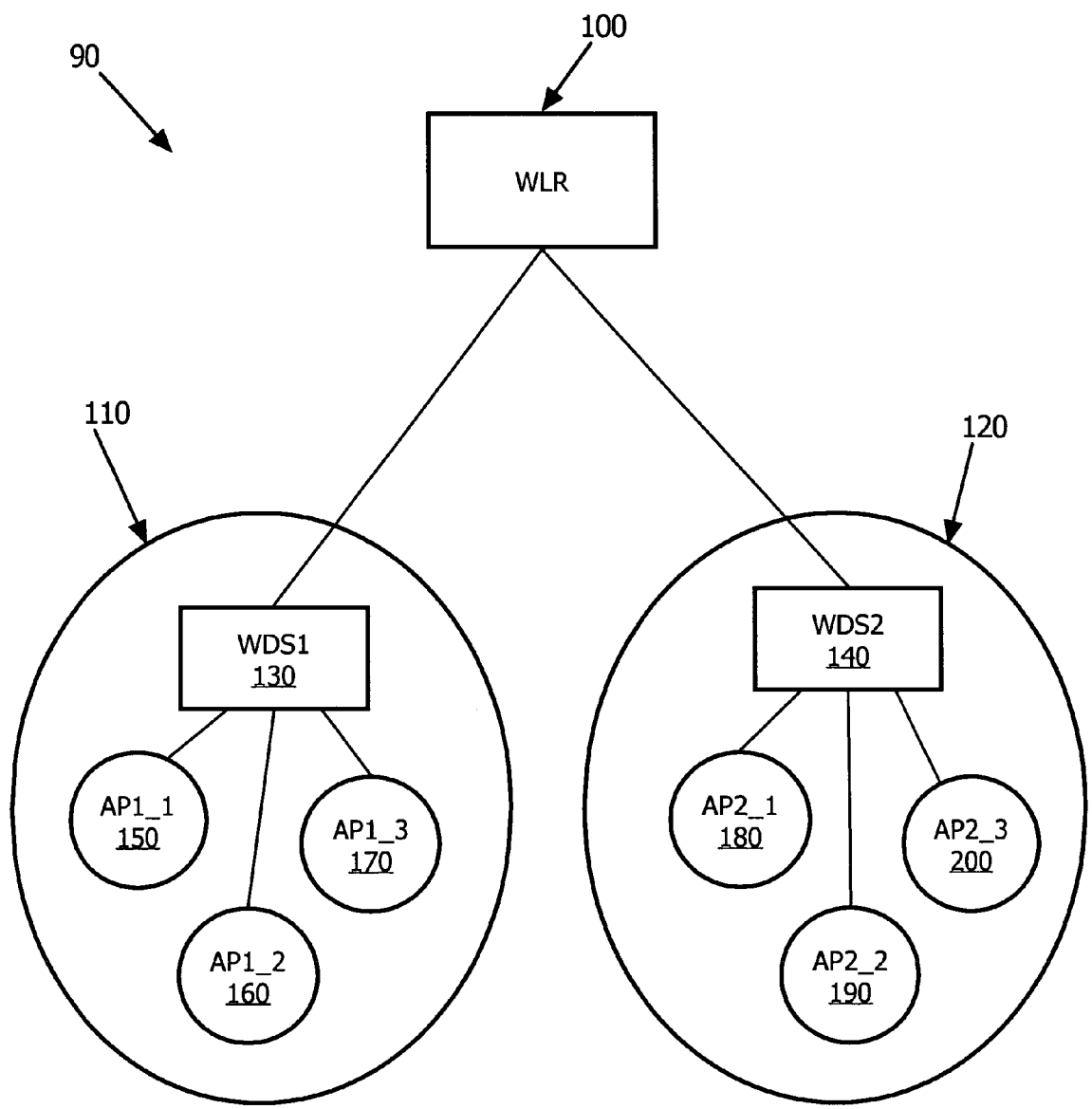
FIG. 2A illustrates a wireless metropolitan area network topology, in accordance with an exemplary embodiment.

As previously indicated, a WMAN can also include a set of access points which are grouped into a wireless domain such as wireless domains 110 and 120 included in the WMAN topology 90 of FIG. 2A. In addition to the wireless domains 110 and 120, WMAN topology 90 also includes a wireless location register (WLR) 100 which provides services for one or more wireless domains such as domains 110 and 120. Domains 110 and 120 each further include a wireless domain server (WDS) (130 or 140) and multiple access points (130, 140, 150, 160, 170, 180 and 190). While each domain 110 and 120 is portrayed as having three access points, it should be understood that this is merely illustrative and that a domain could have any number of access points. Additionally, each domain may contain any combination of short-range and long-range access points. For example, each domain could contain a combination of 802.11 short-range access points and 802.16e long-range access points. For convenience, a group of access points in any one wireless domain may be referred to collectively as access points with no further need to differentiate between short-range and long-range.

Each wireless domain (110, 120) is controlled by a single WDS (110, 120). A WDS caches operational context for access points and mobile stations. For example, WDS 130 caches operational context for access points 150, 160 and 170 and WDS 140 does the same function for access points 180, 190 and 200. An access point may be connected to its corresponding or parent WDS over a logical layer 2 (e.g. Ethernet) link or a logical layer 3 IP link. Additionally, each access point establishes a secure channel with its parent WDS.

In a WMAN with multiple wireless domains, such as domains 110 and 120 contained in FIG. 2A, a WLR (for example, WLR 100) provides multiple functions. One function is to maintain a directory of all WDS's, long-range access points, short-range access points and mobile stations of the WMAN. Another function is to maintain the current home subnet bindings for each mobile station. Yet another function of a WLR is to function as a key distribution center to facilitate security associations between various WDS's. In a particular embodiment, the key distribution center function of a WLR is a Kerberos-like key distribution center function.

The functioning of the WMAN topology 90 will now be further detailed and various aspects of that functioning correspond to the WLCCP context control hierarchy as defined by the WLCCP specification. It should be noted that the following description is one particular implementation of a topology used to achieve the claimed embodiments and other implementations could also be utilized. Initially, each access point (for example, access points 150, 160, 170, 180 and 190) authenticates and establishes a master session key with its parent WDS (130 or 140). The master session key is then used to establish a common set of security credentials, which are shared by the access points (150, 160, 170, 180 and 190) and their parent WDS (130 or 140) and are used to secure communication. Additionally, each WDS (130 and 140) establish security credentials with the WLR 100 in order to facilitate secure communications with the WLR and to facilitate the establishment of WDS to WDS security credentials.

Turning to the situation of a mobile station connecting to and roaming within a WMAN, those processes are facilitated by grouping mobile stations into service sets. Home subnet bindings and security requirements, for example, are typically configured per service set. By default, a mobile station is dynamically assigned to a home subnet bound to its service set when it first enters the WLCCP network. The WLCCP network may contain multiple home subnets of the same class. For example, a network may contain multiple "employee" subnets. A service set is typically bound to the closest home subnet, for the respective class, within each wireless domain. Therefore, by default, a mobile station is dynamically bound to the closest home subnet when it first enters the network.

A service set may be configured as "anchored" or "floating". A mobile station that is "anchored" can roam seamlessly across IP subnet boundaries in multiple wireless domains without changing its IP address or losing other protocol context information. A floating mobile station is always bound to a local home subnet; therefore, a floating mobile station must obtain a new IP address when it roams to a wireless domain that does not have access to its current home subnet. A floating mobile station is said to roam "nomadically" between wireless domains. A voice over IP (VoIP) mobile station, for example, should generally be anchored so that calls are not lost when it roams across IP subnet boundaries.

An WiFi 802.11-type or WiMax 802.16e-type access point determines the default service set for a mobile station, from a service set identifier (SSID) provided by the mobile station, as follows: 1) 802.11-type access point: a mobile station includes an 802.11-standard SSID element in a (Re)Association Request message sent to the 802.11-type access point; and 2) 802.16e-type access point: the IEEE 802.16 draft standards do not define a comparable SSID. One possible solution is for a dual-mode WiMax/WiFi mobile station to include its 802.11 SSID in a proprietary 802.16 TLV (type length value) in an Initial Ranging Request message send to the 802.16e-type access point.

A network administrator can explicitly assign a mobile station to a service set by configuring an SSID for the mobile station in a security server. In a metropolitan area network, for example, a mobile station may be assigned to a service set for a subscription group.

The security server sends a (possibly empty) list of permitted default SSID's or an explicitly assigned SSID to a mobile station's anchor WDS during initial authentication. A mobile station that is not authorized to use a default SSID and is not explicitly assigned to an SSID may be bound to a default "guest" service set and a corresponding guest home subnet.

Figure 2B:
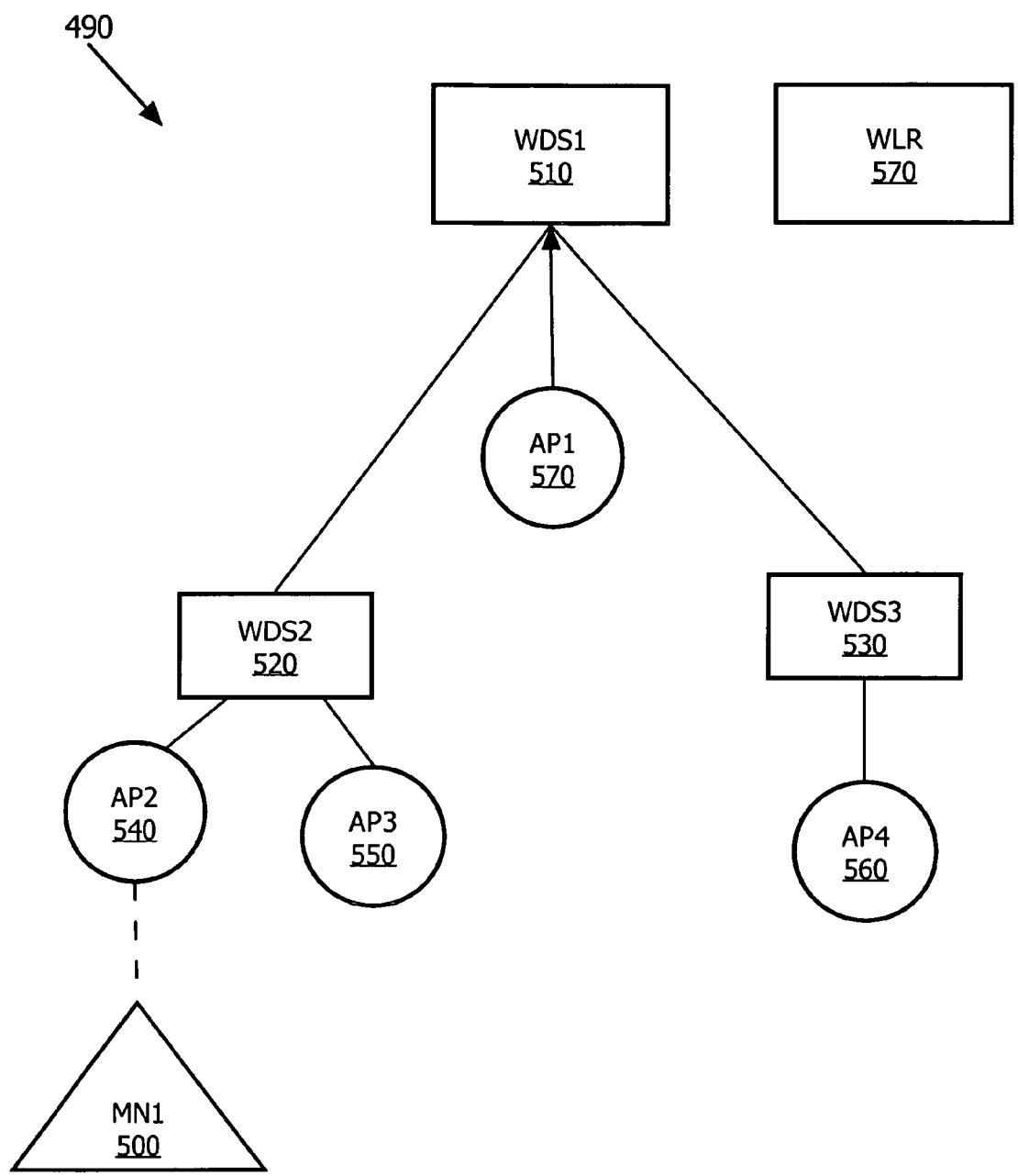
FIG. 2B illustrates a topology tree for a single, anchored mobile station, in accordance with an exemplary embodiment.

A specific example of a mobile station roaming in a WMAN will now be described in reference to FIG. 2B. FIG. 2B illustrates a topology tree 490 for a single, anchored mobile station 500, in accordance with an exemplary embodiment. For simplicity, wireless domains are not explicitly indicated in FIG. 2B. Instead, various wireless domain servers are shown and it should be understood that each of those wireless domain servers are associated with a corresponding wireless domain. Besides the aforementioned mobile station 500, topology tree 490 also includes a WLR 570, multiple wireless domain servers (510, 520 and 530) and access points (540, 550, 560 and 570) that are members of the various wireless domains.

When the mobile station 500 initially connects to a WMAN, an EAP authentication process occurs and a master key is identified by a master key identifier (MKID) as defined by the 802.16 draft standard and 802.11 standard. For didactic purposes, it should be noted that the format of an 802.16e MKID is different from an 802.11 MKID. After the mobile station 500 has authenticated, it is bound to a single anchor wireless domain server (WDS1 510) as it roams between wireless domains of the WMAN, for example the wireless domains associated with wireless domain servers WDS2 520 and WDS3 530. The mobile station's (500) anchor WDS1 (510) stores a "master copy" of the mobile station's "mobility context" and "security context". The wireless domain controlled by a mobile station's (500) anchor WDS (510) is the mobile station's (500) "home wireless domain". If the mobile station (500) roams away from its home wireless domain to a different "foreign wireless domain"—for example the wireless domain represented by WDS2 520, then the mobile station's (500) context is securely forwarded from the mobile station's (500) anchor WDS (510) to the respective "foreign WDS" (WDS2 530). The foreign WDS (530) caches the mobile station's (500) context so that it is not necessary to access the mobile station's anchor WDS 510 each time that the mobile station (500) roams to a new access point (for example, from AP 540 to AP3 550) within the foreign wireless domain controlled by wireless domain server WDS2 520.

Figure 3A:
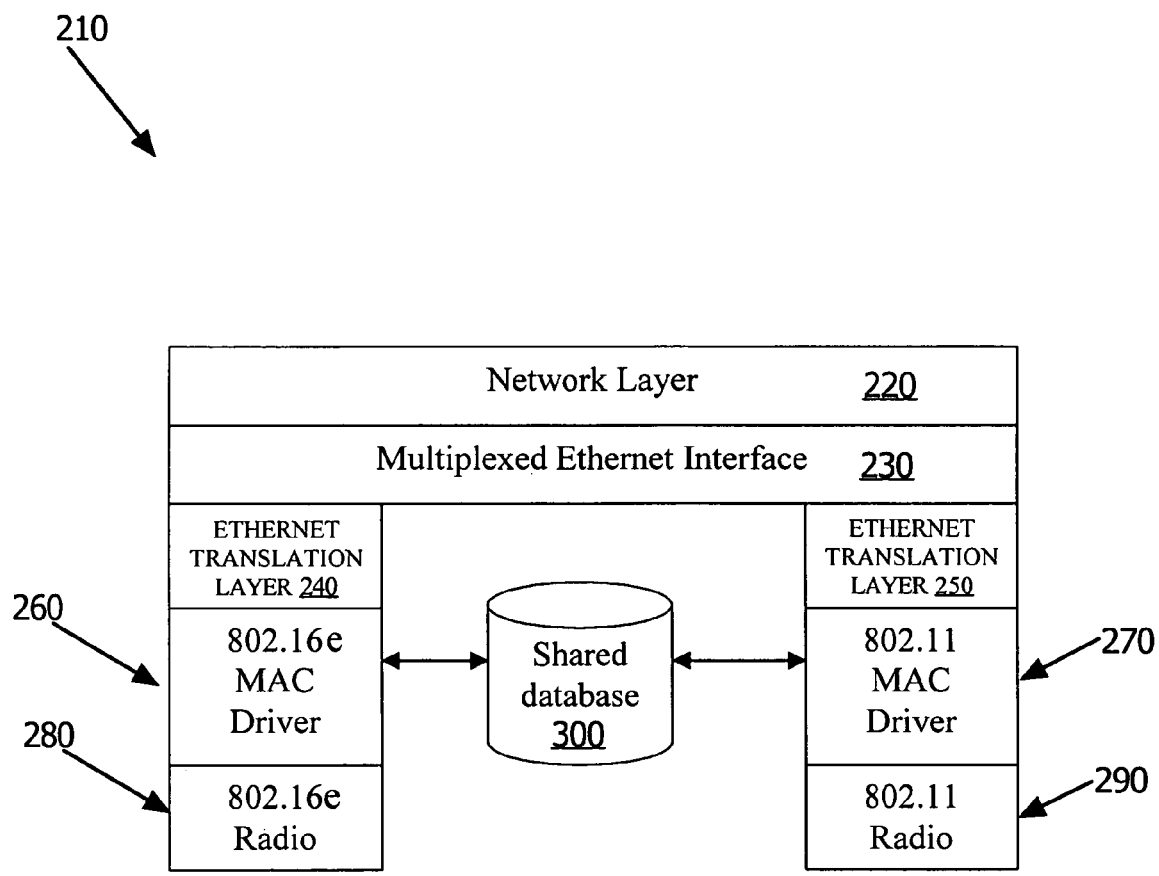
FIG. 3A is a block diagram illustrating a dual-mode (e.g., short-range/long-range protocol) mobile station protocol stack, in accordance with an exemplary embodiment.

Also at any given time, a "control path" for the mobile station 500 lies on a branch of the topology tree 490, which is rooted at the mobile station's (500) anchor WDS1 510. The control path for the mobile station is comprised of the mobile station 500, the mobile station's anchor WDS1 510, any intermediate foreign WDS such as foreign WDS2 520, the mobile station's parent access point (AP1 570) and intermediate logical links. In order for a mobile station to roam in a multi-protocol wireless communication protocol environment, the mobile station may have an individual radio for each wireless communication protocol for which a connection is desired. Therefore, an internal protocol stack for such a mobile station will now be examined. FIG. 3A is a block diagram illustrating a dual-mode (e.g., 802.11/802.16e protocol) mobile station protocol stack 210, in accordance with an exemplary embodiment. The stack 210 contains multiple layers that facilitate conversion of both 802.11/WiFi and 802.16e/WiMax wireless communication protocols to a common wireless communication protocol which in turn facilitates seamless mobile roaming.

Stack 210 includes a network layer 220, a multiplexed Ethernet interface 230 beneath the network layer, first and second Ethernet translation layers (240 and 250) below layer 230 each for 802.11 and 802.16e protocols. Similarly, there are also first and second MAC drivers (260 and 270), and first and second radios (280 and 290) for the 802.11 and 802.16e protocols, respectively. Also included is a shared database 300 that contains security credentials, context information, and neighbor access point information. As the name implies, the shared database 300 allows the MAC drivers (260 and 270) to share security context, connectivity and other state information.

As previously stated, stack 210 includes both an 802.11 radio 280 and an 802.16e radio 290. The MAC drivers (260 and 270) for the radios (280 and 290) provide a single Ethernet data link layer interface to the network layer 220 in that at any one time, only one of the radios (280 and 290) is selected by the multiplexed Ethernet Interface 230 for communication. A dual-mode 802.11/802.16e mobile station is consistently identified by a single IEEE 802 address (e.g. an Ethernet address). At any give time, only one of the radios (280 and 290), in a mobile station, is used for network layer 220 communications. The multiplexed Ethernet interface 230 routes data frames between the active link layer protocol layers and the single network layer 220.

A wireless network topology, such as topology 90 of FIG. 2A, contains an Ethernet network infrastructure and/or an IP network infrastructure. Mobile station data is consistently represented as Ethernet frames or, optionally, as IP packets for transport over the topology 90. Therefore, the mobile station's data is forwarded over the topology's 90 Ethernet/IP infrastructure independently of the mobile station's radio access type.

A WiFi or long-range access point (such as the access points shown in FIG. 2A) and a dual-mode WiFi/long-range mobile station both contain an Ethernet translation or bridging layer such as the Ethernet translation layers 240 and 250. An Ethernet translation layer in a long-range access point, for example, translates transmitted/received Ethernet frames to/from long-range frames. Similarly, Ethernet translation logic in a WiFi/long-range mobile station translates transmitted/received Ethernet frames to/from the radio-specific MAC type (i.e. long-range or WiFi) of the mobile station's currently active radio. For example, a mobile station that is associated to a long-range parent access point translates an Ethernet frame into a long-range frame for transmission to the long-range parent access point. The long-range parent access point then translates the received long-range frame back to an Ethernet frame before forwarding the frame over the topology, such as topology 90 of FIG. 2A. In an alternative embodiment, an all-IP network can be utilized. In such an environment, an access point and a mobile station may also contain an Ethernet-to-IP translation layer. In a preferred embodiment, a single 48-bit MAC address is utilized by a mobile station to identify itself for both WiFi and WiMax communications.

Figure 3B:
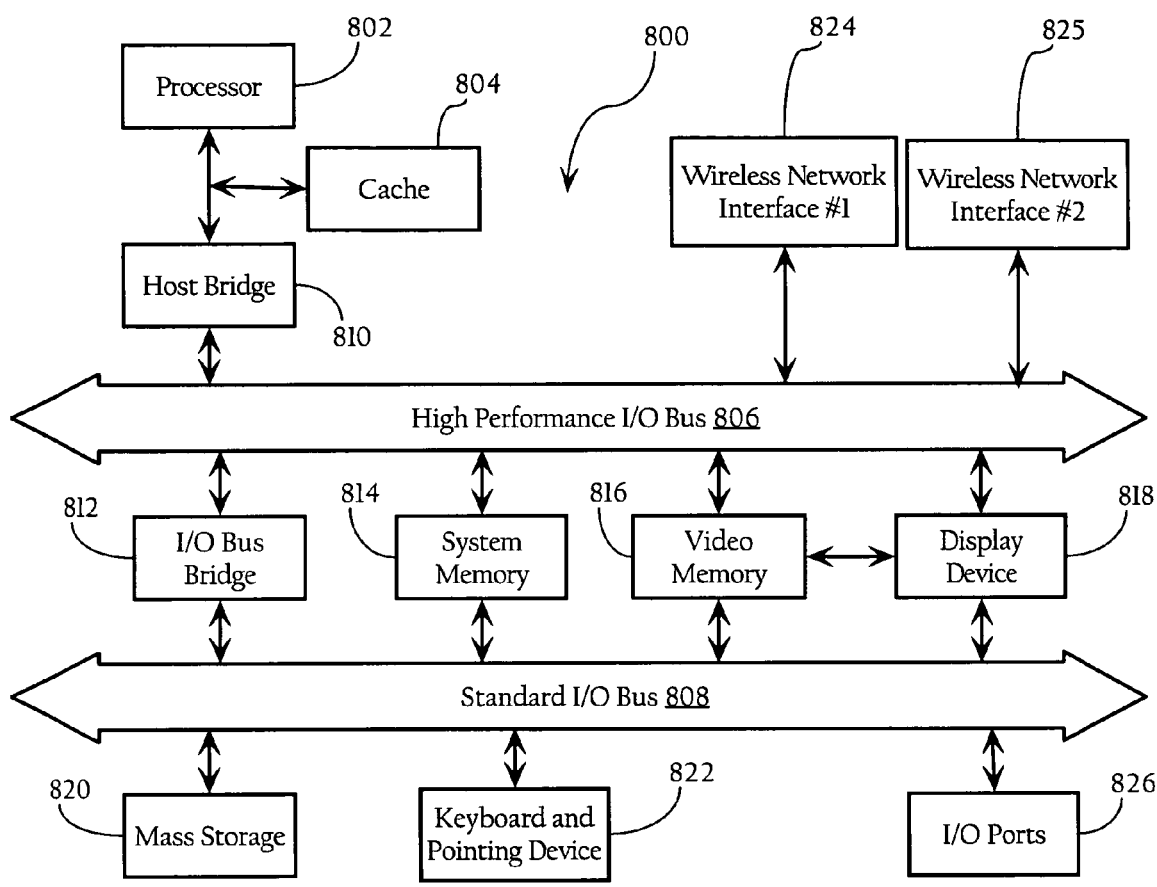
FIG. 3B illustrates, for didactic purposes a hardware system which can be used to implement a wireless client/mobile station, in accordance with an exemplary embodiment.

FIG. 3B illustrates for didactic purposes a hardware system 800, which can be used to implement a wireless client/mobile station, in accordance with an exemplary embodiment. In one embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are two wireless network/communication interfaces 824 and 825, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 800 are described below. In particular, wireless network interfaces 824 and 825 are used to provide communication between system 800 and any of a wide range of wireless networks, such as a WLAN (e.g., IEEE 802.11), etc. Typically, the first wireless network interface 824 will configured according to a first wireless communication protocol and the second wireless network interface 825 will be configured according to a second wireless communication protocol. According to one embodiment, the first protocol would be an 802.11-type wireless communication protocol and the second protocol would be an 802.16e-type wireless communication protocol. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the claimed embodiments may not require nor include all of the above components. For example, the peripheral devices shown coupled to standard I/O bus 808 may be coupled to high performance I/O bus 806. In addition, in some implementations only a single bus may exist with the components of hardware system 800 being coupled to the single bus. Furthermore, additional components may be included in system 800, such as additional processors, storage devices, or memories.

In one embodiment, the operations of multi-protocol wireless communications functionality are implemented as a series of software routines run by hardware system 800. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In alternate embodiments, the claimed embodiments can be implemented in discrete hardware or firmware.

While FIG. 3B illustrates, for didactic purposes, the hardware architecture of a wireless client according to one implementation of the claimed embodiments, the claimed embodiments, however, can be implemented on a wide variety of computer system architectures, such as dual-mode cellular phones, wireless VoIP phones, Personal Digital Assistants, Laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the claimed embodiments, the operating system is the Windows® 95/98/NT/XP operating system, available from Microsoft Corporation of Redmond, Wash. However, the claimed embodiments may be used with other suitable operating systems, such as the Apple Macintosh Operating System, available from Apple Computer Inc. of Cupertino, Calif., UNIX operating systems, LINUX operating systems, and the like.

Figure 3C:
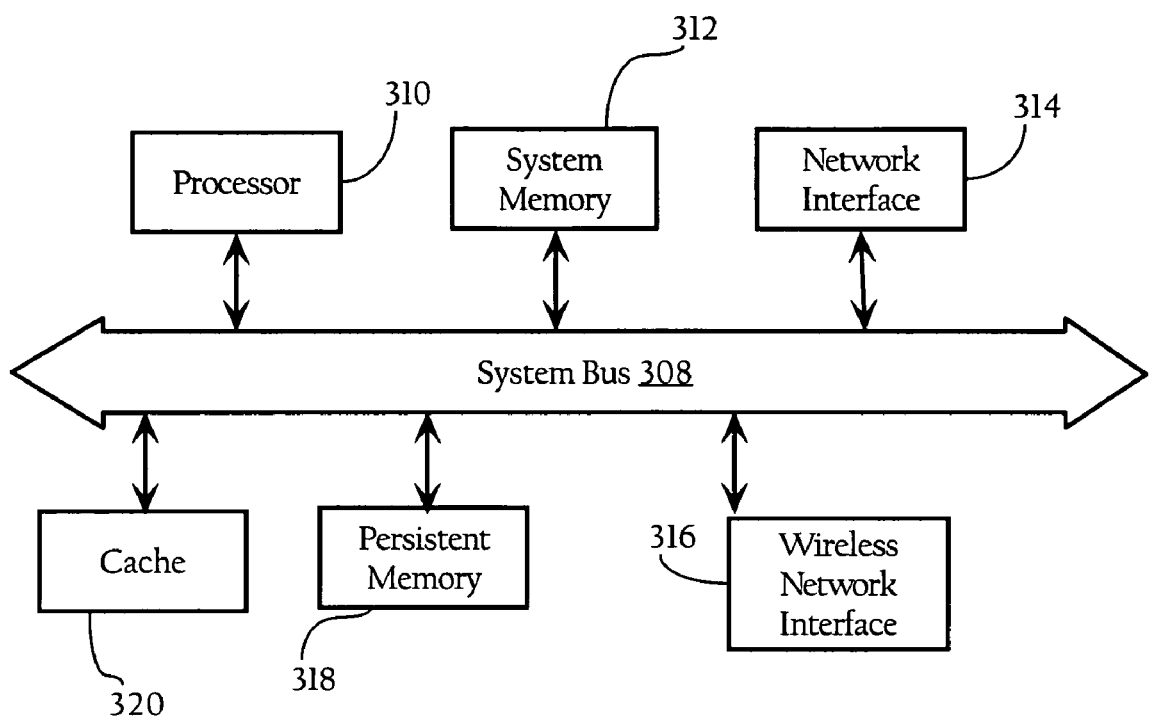
FIG. 3C is a functional block diagram illustrating the components of an access point, in accordance with an exemplary embodiment.

FIG. 3C is a functional block diagram illustrating the components of an access point, in accordance with an exemplary embodiment. In one implementation, the wireless access point comprises a processor 310, a memory 312, a network interface 314 (e.g., an 802.3 interface) for communication with a LAN, a wireless network interface 316 (e.g., an IEEE 802.11 WLAN interface, or an IEEE 802.16e WLAN interface) for wireless communication with one or more wireless clients, a persistent memory 318, a cache 320 for storing VLAN information, and a system bus 308 interconnecting these components. The wireless access points may also include software modules (including DHCP clients, Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310. In some implementations, at least some of the wireless access points can operate in a sensor or detector mode to monitor for infrastructure-side management frames, and to validate the frames as discussed in more detail below. In some implementations, specialized detectors have a similar hardware architecture illustrated in FIG. 3C can be used.

Several preferred embodiments will now be discussed. As previously indicated, it is often preferable to have a mobile station connected to a short-range access point even when a long-range access point is available. The advantages of doing so includes freeing up available bandwidth for long-range access points; a short-range connection will usually provide a faster connection to the mobile station; and short-range access points may provide enhanced services, such as access to high-bandwidth video streams. To achieve such a preferential connection mechanism, a mobile station can check the type of connection that is currently in use. If it is not the preferred connection, for example a short-range connection, then access points in range can be surveyed. If an access point is in range that offers the preferred connection, then the mobile station will connect to that access point that offers the preferred connection. The process then repeats itself.

Figure 4:
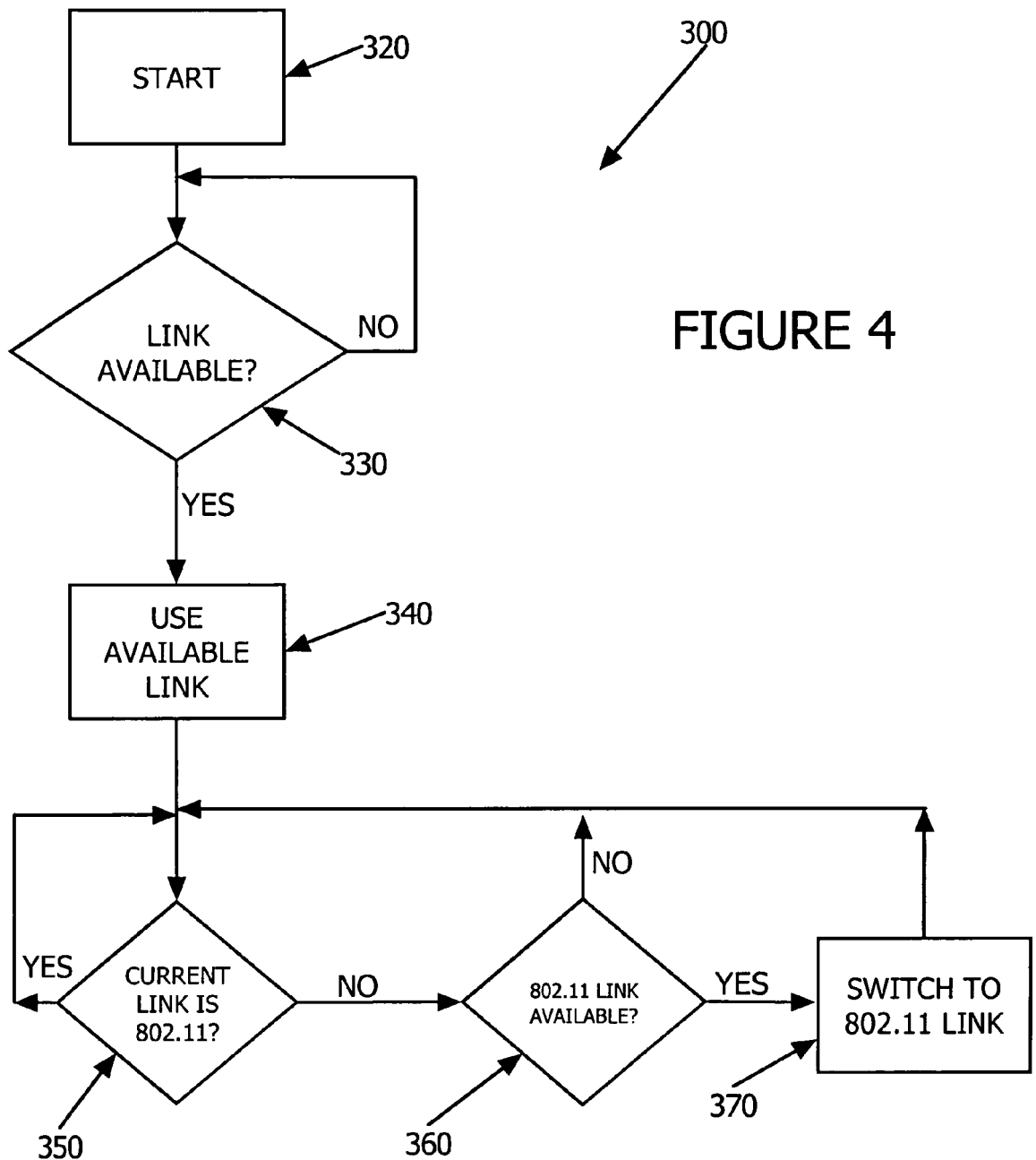
FIG. 4 is a flowchart illustrating a method, executed by a mobile station, directed to selecting a preferred wireless communication protocol, in accordance with an exemplary embodiment.

To further demonstrate, FIG. 4 is a flowchart illustrating a method, executed by a mobile station, directed to selecting a preferred wireless communication protocol, in accordance with an exemplary embodiment. After a start operation 320, a mobile station checks to see if there are any available links at decision block 330. The available links, in this embodiment are either a short-range 802.11-type wireless communication protocol or a long-range 802.16e-type wireless communication protocol. If no link is available, the mobile station will keep on checking for an available link until one becomes available.

Once a link becomes available, the mobile station connects (340) and the mobile station checks to see if the link is an 802.11-type link (350). If yes, then the mobile station will continue to check the link-type (350) in case the mobile station later needs to switch to a different access point—for example, due to roaming. Otherwise, the mobile station checks for availability of the preferred 802.11-type link (360). If an 802.11-type link is not available, the mobile station will continue to check for the availability of one (350). If the 802.11-type link is available, then the mobile station connects (370) to the corresponding access point that is offering the available 802.11-type link. After connecting, the mobile station will continue to check to see if the current connection is an 802.11-type connection (350) as the current connection may change due to roaming.

Figure 5:
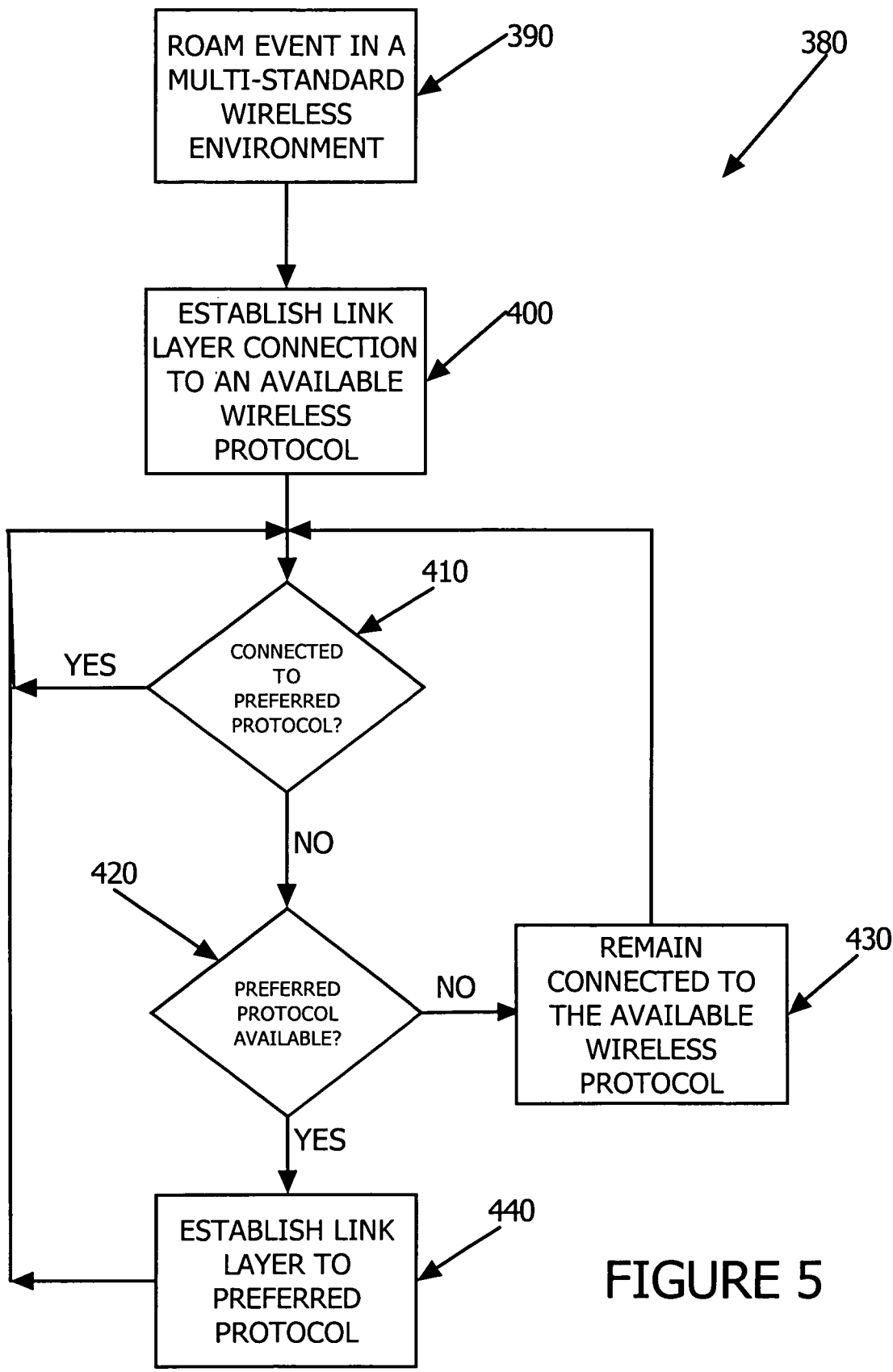
FIG. 5 is a flowchart illustrating another method for a mobile station to select a preferred wireless communication protocol, in accordance with an exemplary embodiment.

Similarly to method 300, FIG. 5 is a flowchart illustrating another method 380 for a mobile station to select a preferred wireless communication protocol, in accordance with an exemplary embodiment. Firstly, the mobile station initiates roam event in a multi-protocol wireless communication protocol (390) and establishes a link layer connection to an available wireless communication protocol (400). Next, the mobile station checks to see if it is connected to the preferred wireless communication protocol (410). As previously stated, the preferred protocol will usually be a short-range wireless communication protocol. If the mobile station is connected to the preferred protocol, then it will check again to see if it is still connected to the preferred one. Again, the mobile station may go out of range of the current access point to which it is connected and then connect to another access point that does not utilize the preferred protocol. Thus, it is necessary to re-check.

If the mobile station is not connected to the preferred protocol, then the mobile station checks to see if it is in range of an access point that does offer the preferred protocol (420). If no, the mobile station maintains its current connection (430) and re-checks for the preferred protocol (410). If the preferred protocol is available, then a connection is established to the preferred protocol (440) and once more the mobile station re-checks the type of connection (410).

Figure 6:
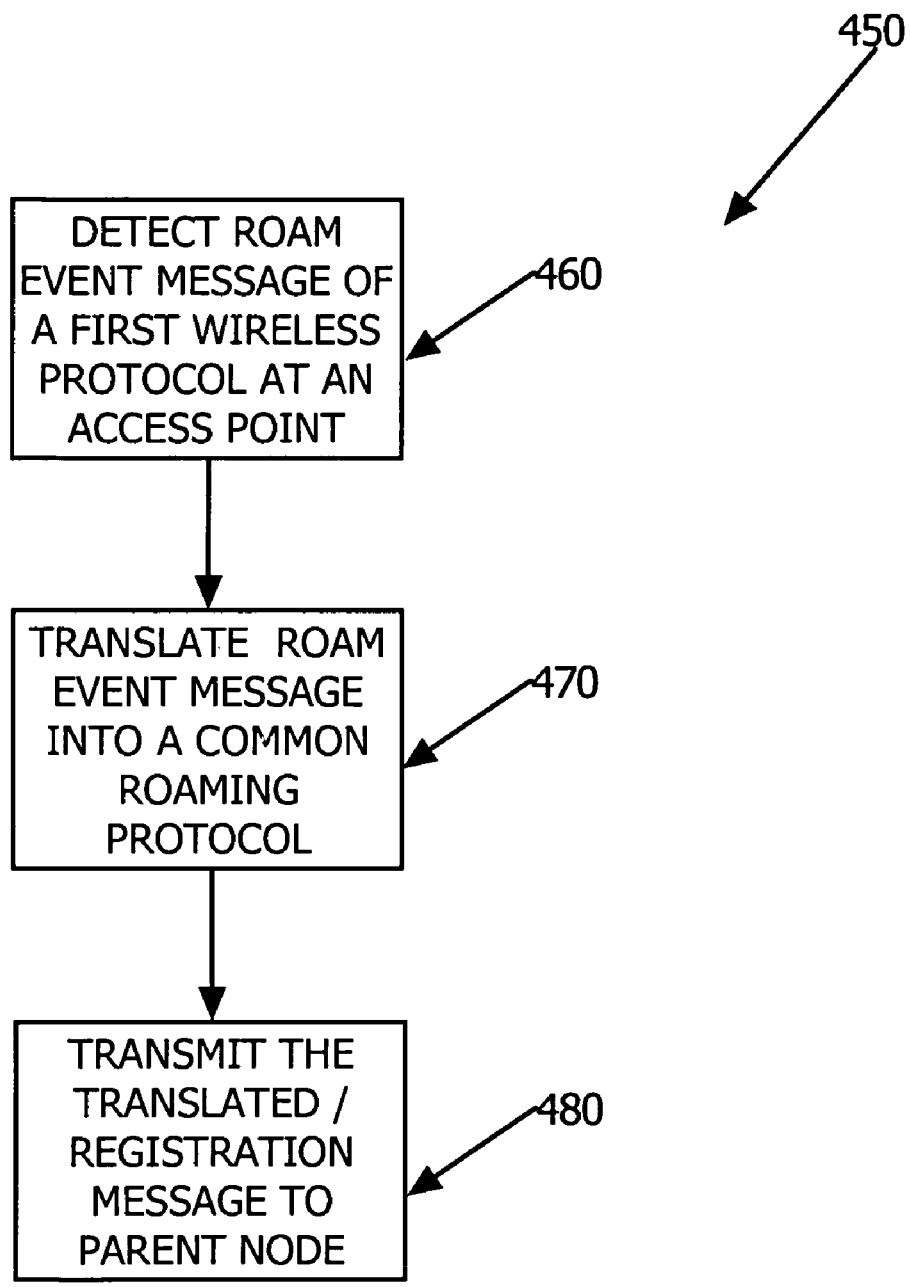
FIG. 6 is a flowchart illustrating a method, executed by an access point, directed to translating a roam event message into a common roaming protocol, in accordance with an exemplary embodiment.

An embodiment will now be presented wherein a new parent access point receives a roam event message, for example—from a mobile station, and how that roam event message is handled. FIG. 6 is a flowchart illustrating a method 450, executed by an access point, directed to translating a roam event message into a common roaming protocol, in accordance with an exemplary embodiment. The access point first receives a roam event and that roam event is of a first wireless communication protocol (460). The roam event is then translated into a registration event of a common roaming protocol (470). For example, when a mobile station roams to a new parent access point, the new access point can translate the radio-protocol-specific roaming event into a WLCCP Registration transaction. The new parent AP forwards a registration message to its parent node in the network topology tree (480), where the parent node may be the local WDS or a parent AP. A registration transaction is used to establish a new control and data path for the mobile station. A registration transaction may trigger a "deregistration" transaction, which is used to delete any old control path and old data path for the mobile station.

Referring back to FIG. 2A, it was previously indicated that access points of various types could be contained in a particular wireless domain such as wireless domain 110 or 120. Keeping that in mind, method 450 could possibly occur in access point 150 which is, for example, a short-range access point. If access point 160 were to be labeled a long-range access point, then method 450 could also occur at that access point. However, a roam event of a second wireless communication protocol would be detected by access point 160 instead of the first protocol that access point 150 is capable of utilizing.

In addition to the various advantages that were mentioned in various parts of the detailed description, the claimed embodiments offer other advantages. For example, by utilizing the claimed embodiments, a single controller can be used to control both short-range WiFi and long-range WiMax access points. This greatly simplifies handoff of connections between access points and other context transfers. Additionally, the same network infrastructure and context control protocol can be used for both WLAN's and wireless metropolitan area networks where before doing so was problematic. Finally, the claimed embodiments can easily be applied to a wide variety of radio types and wireless communication protocols.

The following describes, for didactic purposes, mesh networks, context management and other roaming operations implemented by a multi-protocol wireless network infrastructure, according to one possible embodiment of the invention.

Mesh Networks

Figure 7:
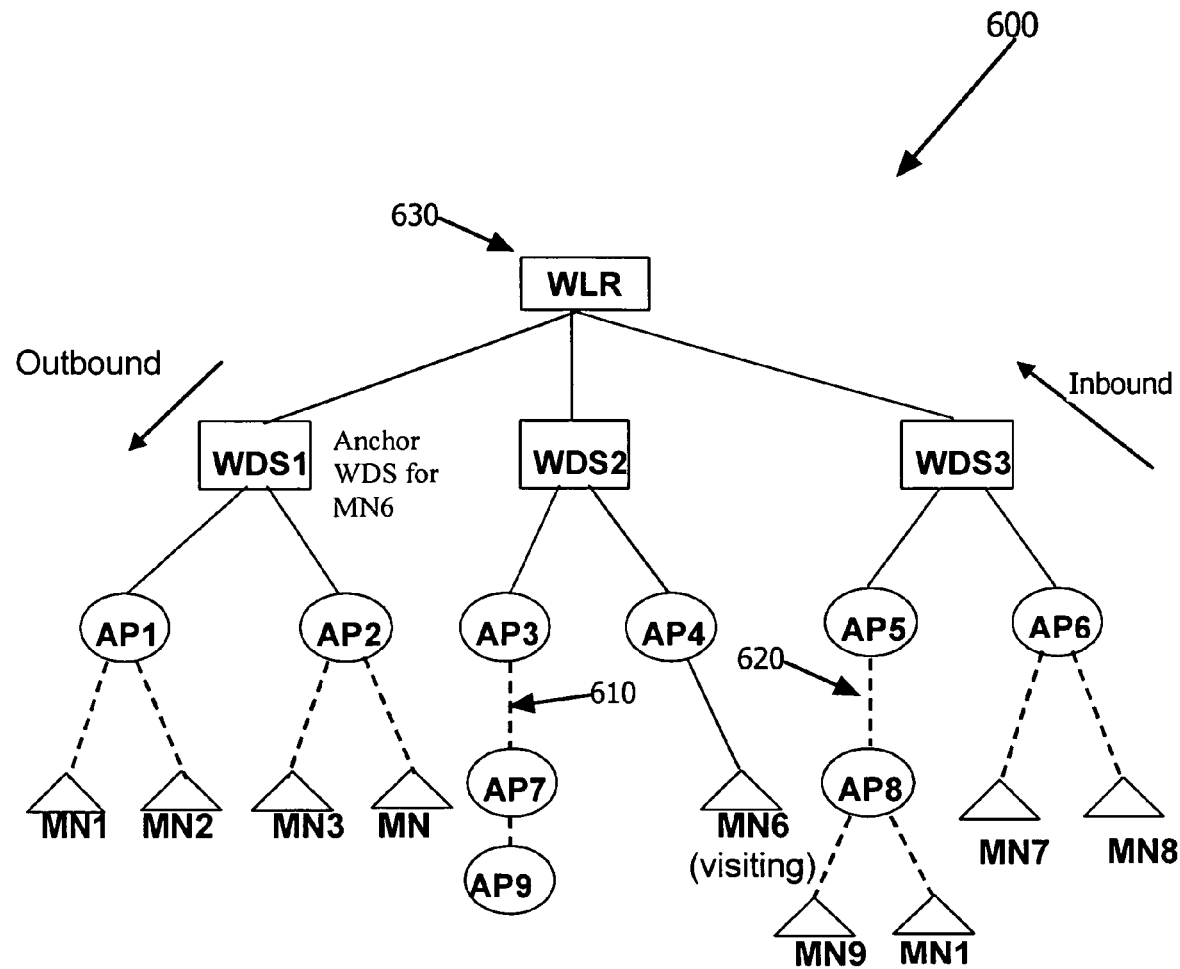
FIG. 7 illustrates a multi-protocol wireless mesh network topology, in accordance with an exemplary embodiment.

FIG. 7 illustrates a multi-protocol wireless mesh network topology 600, in accordance with an exemplary embodiment. A "Mesh Network" contains "wireless access points" (for example, wireless access points AP7 and AP8) which are connected to a parent access point (for example, access points AP3 and AP5) via a wireless uplink (610, 620). The mesh network 600 may contain both WiMax and WiFi access point-to-access point links on a single multi-hop path (for example, access points AP3, AP7 and AP9) and a single access point may contain both WiMax and WiFi radios. For example, a single access point (AP7) may have a long-range WiMax uplink to a parent access point (AP3) and may provide WiFi coverage to descendant access points (AP9) and mobile stations.

WLCCP includes a "hop-wise" message routing option, which is intended to support wireless access points (i.e. in a mesh network). If hop-wise routing is enabled, then WLCCP Registration, Deregistration, and Detach messages are forwarded "hop-wise" to the hop address of each access point on the path to the final destination of the message. For example, a WLCCP Registration Request message, which is originated by a wireless access point for a mobile station, is forwarded to the hop address of the parent access point. The parent access point processes the message and forwards it inbound to the next hop on the path to the local WDS.

An access point, in one implementation, always establishes a secure channel with its parent WDS. In a mesh network, a "wireless access point" establishes a secure channel with its parent access point. The WDS functions as a Kerberos-like KDC to establish a security credentials shared by a parent access point and a wireless child access point. A WLCCP message is always authenticated with the security credentials shared by the immediate sender and the immediate receiver.

WLCCP WDS advertisement messages also include hop-count and path-cost fields that are used to indicate the number of hops and the aggregate path cost to the distribution network. In one implementation, the hop count and path cost information are copied into 802.11 and 802.16 advertisement messages (e.g. 802.11 Beacons or 802.16 DCD messages) so that wireless access points can scan for the least-cost path to the distribution network.

Context Management

This section describes, in more detail, how WLCCP (EDCS-220343) is extended to support WiMax access points and WiMax/WiFi mobile stations. An overview of existing WLCCP context management logic is provided for convenience. It should be noted that WLCCP is merely one of many wireless management protocols that can be used in conjunction with the claimed embodiments.

A. Overview

An "anchored" mobile station (MN6) is statically or dynamically bound to a single anchor WDS (WDS1). The anchor WDS (WDS1) for a "floating" mobile station is always the local WDS (WDS1). By default, the local WDS (WDS1) is dynamically established as the anchor WDS, for an anchored mobile station (MN6), when the mobile station (MN6) first enters the WMAN. Alternatively, a network administrator can statically assign a mobile station to a fixed anchor WDS. The current anchor WDS (WDS1) bindings for each mobile station (MN6) are stored in the WLR (630). A WLR is not needed in a WMAN that has a single WDS. When a mobile station first roams into a wireless domain, the local WDS queries the WLR to determine the anchor WDS for the mobile station. When a mobile station first roams into a foreign wireless domain, the foreign WDS fetches the mobile station's context from the mobile station's anchor WDS.

By default, a mobile station is bound to the home subnet that is bound to the mobile station's Service Set in the mobile station's anchor WDS.

WLCCP transactions are used to manage a mobile station's operational context. A mobile station's operational context includes:

Static configuration parameters. Static configuration parameters are obtained from a configuration server(s) when a mobile station initially enters the network. The parameters are cached so that it is not necessary to access the configuration server each time the mobile station roams.

Mobility context (i.e. the mobile station's forwarding path). WLCCP (re)establishes a mobile station's forwarding path on access point-to-access point wireless links and on IP tunnel links.

Security context

Wireless QoS context

IP multicast group membership

A mobile station performs "initial authentication" when it first enters the WLCCP network. Initial authentication establishes "security context" for the mobile station, as described below. Thereafter, "fast re-authentication" is used to quickly re-establish a mobile station's security context when the mobile station roams. Static configuration parameters are also obtained during initial authentication.

WLCCP transactions, and corresponding WLCCP message types, are defined for the following mobile station context management functions:

Authentication

WLCCP Authentication (AAA) messages are used to relay EAP messages between a mobile station and a "mobile station Authenticator", located in the mobile station's home WDS, during initial EAP-based authentication. (EAP-based mobile station authentication is defined in both the WiFi and WiMax standards.)

Preregistration

A Preregistration transaction is used to forward a mobile station's security credentials, required for "fast re-authentication", to a target access point. A "Push Preregistration" transaction is used to push a mobile station's security credentials to a "target access point" before the mobile station roams. A "Pull Preregistration" transaction is originated by a new parent access point to fetch a mobile station's security credentials after the mobile station roams. A Pull Preregistration transaction also provides the "two-way handshake" that is used to "fast re-authenticate" a mobile station in Cisco's Central Key Management Protocol (CCKM).

Registration

A Registration transaction is used established the forwarding path for a mobile station and it is used to maintain a node's operational context in each node on the multi-hop path to the mobile station's home WDS. Registration establishes the forwarding path on Layer 2 access point-to-access point wireless links and on IP tunnel links. An "Initial Registration" transaction is originated by a mobile station's parent access point to initially register a mobile station after the mobile station successfully completes Initial Authentication. An "Update Registration" transaction is used to refresh a mobile station's path and to maintain context information in each node on the mobile station's path.

Deregistration

A Deregistration transaction is used to delete and old forwarding path, and free any resources on the old path, when a mobile station roams. A Deregistration transaction is always triggered by a WLCCP Registration transaction.

5. Detach

When a parent access point independently detects that a child mobile station is lost, the parent access point originates a WLCCP Detach transaction to delete the mobile station's path.

The table below indicates how WLCCP radio-independent transactions are triggered by radio-specific events and messages:

TABLE 1

| WLCCP Transaction | 802.11 Trigger | 802.16e Trigger |
| --- | --- | --- |
| Authentication (AAA) | EAP message generated by the mobile station or mobile station Authenticator | EAP message generated by the mobile station or mobile station Authenticator |
| "Pull" Preregistration | 802.11 (Re)Association | Initial Ranging |
| "Push" Preregistration | (Not implemented) | MSS_HO-Req/Pre-authentication |
| Initial Registration | Successful completion of Initial EAP-based Authentication | 802.16 REG-REQ message |
| Deregistration | NA | NA |
| Detach | Radio link loss or 802.11 Disassociation | Radio link loss or select MSS_DEREG-REQ messages |

WLCCP Deregistration logic and Detach logic are generally independent of the underlying radio technology and is not discussed further.

EAP-based initial authentication is generally the same for both WiMax and WiFi. Fast re-authentication is different for WiMax and WiFi; however, the security credentials used for fast re-authentication may be the same for WiMax and WiFi. Initial authentication and fast re-authentication are discussed in more detail, below, in the section entitled "Security Context Transfer".

Pre-registration and Registration are generally the same for both WiMax and WiFi; however, the events that trigger Pre-registration and Registration are radio-type-specific. Preregistration and Registration are discussed in more detail below.

b. WLCCP Preregistration

A WLCCP Preregistration transaction is originated "on-demand" to pre-fetch mobile station security credentials that are required for fast re-authentication. When a mobile station roams to a new parent access point, the new access point originates a WLCCP Preregistration transaction for the mobile station if it does not already have security credentials cached for the mobile station. A mobile station's context may be "predictively" forwarded to a target access point, before the mobile station roams to that access point, as described in the following section. A Preregistration transaction is triggered as follows:

A WiFi access point originates a Preregistration transaction for a mobile station, when it receives an 802.11 (Re)Association Request for the mobile station. An 802.11 Reassociation message may contain a list of MKIDS. A WiFi access point may originate a Preregistration transaction if it does not have the Master Key, identified by the MKID, cached.

A WiMax access point originates a Preregistration transaction for a mobile station, when it receives an 802.16 Initial Ranging Request from the mobile station.

WiMax or WiFi fast re-authentication can proceed when the parent access point receives a Preregistration Reply, with a "good" status.

c. Predictive Context Forwarding

"Predictive Context Forwarding" often refers to a method where the infrastructure determines statistical roaming patterns and predicatively forwards mobile station context to other access points where mobile stations are likely to roam. Such predictive context forwarding creates a "distributed database problem", where it is difficult to synchronize context information that is scattered across multiple access points. In this section, "predictive context forwarding" refers to a method where a mobile station indicates a roam decision to the infrastructure and context is selectively forwarded to the mobile station's "target" parent access point, just before the mobile station roams. The context information is discarded, by the target access point, if the mobile station does not actually roam to that access point within a short period.

This section describes a WLCCP "Forward Handoff Protocol" that is used to predictively forward a mobile station's context to a "target access point" while the mobile station is still attached to its current parent access point. The Forward Handoff Protocol should not be confused with the "Deregistration" handoff protocol that is used to delete an old path when a mobile station roams. The WLCCP Forward Handoff Protocol is triggered by the existing 802.16e handoff protocol, which is defined in the 802.16e draft standard. When a mobile station intends to roam to a "target access point", it sends a forward handoff request (i.e. an 802.16e MOB-MSSHO-REQ message). The handoff request contains the APRID of the target access point.

When a parent access point receives a forward handoff request for a child mobile station, the parent access point sends an "inbound" WLCCP Forward-HO Request message to the local WDS. The local WDS forwards the Forward-HO Request as follows:

If the target access point is in the same wireless domain as the parent access point, then the local WDS forwards the mobile station's context to the target access point in an "outbound" Forward-HO Request message.

If the target access point is not in the same wireless domain as the mobile station's current parent access point, then the forwarding logic depends on whether the local WDS is the mobile station's anchor WDS:

If the local WDS is the mobile station's anchor WDS, then the anchor WDS forwards the mobile station's context, in an outbound Forward-HO Request, to the new "foreign WDS". The foreign WDS then forwards the outbound Forward-HO Request to the target access point.

otherwise, if the local WDS is not the mobile station's anchor WDS, then the local "foreign" WDS forwards the "inbound" Forward-HO Request to the mobile station's anchor WDS.

If the target access point is in the anchor WDS's domain, then the anchor WDS forwards the mobile station's context, in an "outbound" Forward-HO Request, to the target access point;

otherwise, the anchor WDS forwards the mobile station's context, in an "outbound" Forward-HO Request, to the new foreign WDS; the new foreign WDS then forwards the outbound Forward-HO Request to the target access point.

When a target access point receives an outbound Forward-HO Request, it sends a matching "inbound" WLCCP Forward-HO Reply message to the local WDS. The Forward-HO Reply is forwarded back to the mobile station's current parent access point, via the parent WDS of the target access point and the parent WDS of the current parent access point, which may be the same.

An anchor WDS may query the WLR to determine the parent WDS for the target access point.

Mobile station context, which is predictively forwarded to a non-parent target access point, is quickly aged and discarded if the mobile station does not actually roam to that access point within a small time period (e.g. within 60 seconds).

d. WLCCP Registration

A WLCCP Registration transaction is used to establish the WLCCP control path for a mobile station, after the mobile station is (re)authenticated. In a simple implementation, WLCCP Registration is also used to establish the data path to a mobile station's virtual home subnet. The data path to a mobile station's home subnet will include one or more IP tunnel links, if the mobile station's parent AP does not have Ethernet access to the home subnet.

A WiFi or WiMax access point originates a "proxy" Registration transaction for a mobile station as follows:

A parent WiFi access point originates a WLCCP Registration transaction for a mobile station, when the mobile station successfully completes initial authentication or fast re-authentication.

A parent WiMax access point originates a WLCCP Registration transaction for an authenticated mobile station, when it receives an 802.16 REG-REQ from the mobile station. A WiMax mobile station sends a standard 802.16 REG-REQ to its parent access point after it successfully completes initial authentication or fast re-authentication.

When a mobile station roams, a Registration Request is forwarded inbound on the new path in the mobile station's topology tree until it reaches a "common WDS", which is both on the old path and the new path. If the old access point and new access point are in the same wireless domain, then the local WDS is the "common WDS"; otherwise, the mobile station's anchor WDS is the common WDS. The common WDS sends a Deregistration Request, which is used to delete the mobile station's old path. The Deregistration Request is forwarded outbound until it reaches the mobile station's old parent access point.

As described above, WiMax access points may provide a ubiquitous "umbrella network" and WiFi access points may provide overlay coverage in select "hot spot" areas. In a simple mobile station implementation, a dual-mode mobile station (i.e. with dual multiplexed radio interfaces, as described above) can "activate" its 802.11 interface whenever it has a good link to a parent WiFi access point. While a mobile station is attached on an 802.11 link, the mobile station can maintain a backup, "inactive" 802.16e link with a WiMax access point—so that it can quickly roam back to the 802.16 umbrella network whenever an 802.11 link is not available.

A dual-mode mobile station can maintain an "authenticated" 802.16e link and quickly transition the 802.16e link to an active or inactive state, as follows: A parent WiMax access point does NOT originate a WLCCP registration transaction immediately after a child 802.16e mobile station completes EAP-based authentication. Therefore, a dual-mode mobile station can authenticate with a parent 802.16e access point, over an "inactive" 802.16e radio interface, without triggering a WLCCP registration transaction and a corresponding forwarding path update. When a dual-mode mobile station determines that its 802.16e interface should be "activated", it can send an 802.16 REG-REQ message to its parent WiMax access point to "activate" the 802.16e link to the parent access point. The parent WiMax access point will originate a WLCCP registration transaction for the mobile station when it receives the 802.16 REG-REQ message. The WLCCP registration transaction establishes the mobile station's new forwarding path through the WiMax access point. When a mobile station determines that its 802.16e radio interface should be deactivated (i.e. because it established a good 802.11 link), it can send an 802.16e MSS-DEREG-REQ message to its parent WiMax access point to "deactivate" the 802.16e link to the parent access point. The parent WiMax access point can originate a WLCCP Detach transaction, when it receives the MSS-DEREG-REQ message, to delete the mobile station's old path.

A dual-mode mobile station can potentially use a similar mechanism to activate and deactivate an authenticated 802.11 link. The 802.11 standard does not define an 802.11 registration message.

e. Mobility Context Transfer

WLCCP mobility context transfer is generally unaffected by the introduction of WiMax access points and mobile stations. An "anchored" dual-mode WiMax/WiFi mobile station is bound to a single "virtual home subnet" as it roams between WiMax and WiFi access points within the WMAN. Data frames destined to a mobile station, or sent by a mobile station, are "tunneled" over the WMAN between the mobile station and a home tunnel endpoint" (HTEP) that provides access to a mobile station's home subnet. In one embodiment, a tunnel is an "IP tunnel" and each tunnel endpoint is identified by an IP address. A data frame is sent over an IP tunnel by encapsulating the frame in an IP packet. The IP destination and source addresses, in the outer IP encapsulation header, identify the IP tunnel endpoints. When a mobile station roams into a foreign wireless domain, the mobile station's data traffic is forwarded over two concatenated IP tunnels: a) a tunnel between the parent access point and the foreign WDS, and b) a "cross tunnel" that exists between the mobile station's HTEP and a "visitor tunnel endpoint" in the foreign WDS.

A mobile station's "mobility context" is comprised of the mobile station's current home subnet and tunnel endpoint identifiers. When a mobile station roams to a new parent access point, the mobile station's mobility context is fetched, and a tunneled path, from the mobile station's parent access point to the HTEP on the mobile station's home subnet, is re-established.

A data frame, which is forwarded on an IP tunnel, can be an Ethernet frame or an IP packet. In an "all-IP network", only IP packets are forwarded on IP tunnels. In an all-IP network, parent 802.11 access points and mobile stations bridge between Ethernet and IP, as described in the section entitled "IP-to-Ethernet Bridging".

f. Security Context Transfer

A mobile station performs initial authentication when it first enters the WMAN.

Initial IEEE 802.1 µl mobile station authentication is based on the Extensible Authentication Protocol (EAP).

Initial IEEE 802.16 mobile station authentication is based on a) EAP or b) public key (PK) X.509 digital certificates and the RSA PKCS #1 algorithm.

In a network that contains both WiMax and WiFi access points, it is generally assumed that all mobile stations will perform initial "EAP-based" authentication.

When a mobile station first enters the WMAN, it performs initial EAP-based authentication with a "mobile station authenticator" co-located with the mobile station's anchor WDS. A parent access point relays EAP messages, between a mobile station and the mobile station authenticator, encapsulated in WLCCP AAA messages.

Initial EAP-based authentication establishes a Master Key for an 802.16 or 802.11 mobile station, as specified in the IEEE 802.16 draft standard and in the IEEE 802.11i standard. A single Master Key is established for a mobile station, independently of the mobile station's radio access method. In the 802.16 draft standard, the Master Key is termed the "EAP Master Key"; whereas, in the 802.11i standard the Master Key is termed the "Pairwise Master Key" (PMK). An 802.16 EAP Master Key is equivalent to an 802.11 PMK. This is consistent with the IEEE 802.16e draft specification in that the specification refers to the EAP Master Key as a PMK.

A Master Key is identified by a Master Key Identifier (MKID) in both the 802.16 draft standard and 802.11i standard; however the format of the 802.16 and 802.11 MKIDs are different. Therefore, a mobile station will generally store both an 802.16 and an 802.11 MKID, which identify the mobile station's single Master Key.

When a mobile station successfully completes initial authentication, the mobile station's anchor WDS securely forwards the mobile station's Master Key to the mobile station's parent access point, and any intermediate foreign WDS, in a WLCCP AAA "Key" message".

A parent 802.11 access point uses the Master Key to establish a Pairwise Transient Key (PTK), via the 802.1 µl 4-way handshake, as specified in the 802.1 µl standard. An 802.11 access point then uses the PTK to securely deliver a Group Key to the mobile station.

A parent 802.16 access point uses the Master Key to establish an Authentication Key (AK) via a 3-way EAP-Key-Request/Reply/Confirm handshake; the parent access point then uses the AK to establish one or more Traffic Encryption Keys (TEKs), as defined in the 802.16 draft standard.

A Master Key has a limited lifetime; therefore, a mobile station periodically performs initial authentication to establish a new Master Key. The lifetime of any 802.16 or 802.11 key, derived from a common Master Key, are generally not greater than the remaining lifetime of the Master Key.

As noted above, a mobile station performs "fast reauthentication", whenever it roams to a new parent access point, to quickly re-authenticate and re-establish secure communications channels. A mobile station's Master Key is securely transferred to the new parent access point, and any intermediate new foreign WDS, when a mobile station roams. The single Master Key is used by 802.11-specific and 802.16-specific fast reauthentication protocols, as follows:

If the mobile station roams to an 802.16 access point, then the Master Key and the 3-way EAP-Key-Request/Reply/Confirm handshake, specified in the IEEE 802.16 draft standard, is used to establish mutual authentication and an Authentication Key (AK) between the mobile station and the mobile station's parent access point. The parent access point then uses the AK to securely deliver one or more TEKs (e.g. a unicast TEK and a multicast TEK) to the mobile station.

If the mobile station roams to an 802.11 access point, then the Master Key and the 4-way handshake, specified in the IEEE 802.1 µl standard, is used to establish mutual authentication and a unicast PTK. The PTK is then used to securely deliver a multicast Group Key to the mobile station.

It is important to note that the Master Key and the 802.11 and 802.16 fast reauthentication protocols are independent of the mobile station's initial EAP-based authentication method.

In the 802.11 and 802.16 fast reauthentication protocols described above, the Master Key is securely forwarded to the 802.11 or 802.16 parent access point. A slightly more secure, but slower, fast reauthentication method is possible for 802.16 fast reauthentication:

A Master Key is not forwarded to the parent access point. Instead, the re-authenticator is located in the local WDS and the mobile station performs the 802.16 3-way handshake with the WDS. The parent access point simply relays re-authentication messages between the local WDS and the mobile station.

After a mobile station completes the 802.16 3-way handshake with the WDS, the WDS securely forwards the AK, established by the 3-way handshake, to the mobile station's parent access point.

The parent access point can then use the AK to establish and refresh TEKs.

d. Pre-Authentication

The IEEE 802.16 draft standard defines a method where a mobile station can "pre-authenticate" with a non-parent "target" access point by sending a Pre-authentication Request message, which contains an MKID, to the target access point, via the mobile station's current parent access point. The target access point sends a Pre-authentication Reply to indicate that it has the Master Key identified by the MKID.

802.16 pre-authentication can, potentially, be used to trigger "predictive context forwarding" to a target access point before a mobile station roams. Predictive context forwarding is described above.

h. QoS Context Transfer

QoS context transfer is generally an admissions control context transfer problem. Both 802.11e and 802.16 define QoS admissions control methods, where a mobile station requests its parent access point to admit one or more QoS traffic streams. 802.11/802.16 admission control primarily applies to the coverage area of the parent access point. When a mobile station roams, its QoS streams should be re-admitted by the new parent access point.

Note that a WiMax or a WiFi mobile station is only responsible for establishing QoS for its uplink and downlink wireless streams. It is not responsible for establishing RSVP-like QoS for an entire end-to-end stream. For example, if a WiMax VoIP mobile station and a WiFi VoIP mobile station are communicating in the same WMAN then the WiMax mobile station uses 802.16 admissions control signaling to reserve bandwidth for its uplink and downlink voice streams and the WiFi mobile station uses 802.11e admissions control signaling to reserve bandwidth for its uplink and downlink voice streams.

A QoS stream can be admitted locally, by a parent access point, into the access point's radio coverage area. In a WMAN, all mobile station data traffic will likely be forwarded through a "wired" distribution network, for policy reasons. In a "mesh" WMAN, the forwarding path between a mobile station and the distribution network may include wireless access point-to-access point links. In such a mesh WMAN, a mobile station's uplink or downlink QoS streams can be admitted by the mobile station's parent access point and by any ancestor access points on the multi-hop wireless path to the distribution network. Therefore, a QoS admission or delete request, from a WiMax or WiFi client, should be forwarded inbound to each access point on the path from the mobile station to the local WDS.

In a mesh WMAN, where all traffic is forwarded through the distribution network, the available bandwidth on a radio in a child "wireless" access point can never be greater than the available bandwidth on any link in the multi-hop path to the distribution network. A wired or wireless parent access point periodically (i.e. every 3-5 seconds) sends WLCCP WDS-Advertisement messages to each wireless child access point. A parent access point can advertise the available bandwidth of a radio interface, to each child access point that is attached to the radio interface, by including an "available bandwidth" TLV in its WDS-Advertisement messages. When a child access point receives an "available bandwidth" TLV, it should adjust the available bandwidth on each of its radios, as required, so that it is not greater than the available uplink bandwidth. The child access point, in turn, can advertise its available bandwidth to its child access points by including a "path bandwidth" TLV in its WDS-Advertisement messages.

Issues related to admissions control context transfer include the following:

When a mobile station roams, a new parent access point may not be able to admit a mobile station's QoS streams due to a lack of resources.

Multiple access points may cover a single area. Ideally, a mobile station should be able to determine if a potential parent access point will admit its QoS streams without iteratively attaching and authenticating with each potential parent access point.

802.11e and 802.16 define different QoS Admissions Control signaling protocols.

In a mesh network, the multi-hop path from a mobile station to the distribution network may contain both WiMax and WiFi access point-to-access point links.

Unicast QoS streams should be "load-balanced" across the set of access points that cover a given area. In a mesh network, QoS streams should also be load-balanced across the access point-to-access point wireless "trunk" links that provide access to the distribution network.

Load-balancing is not useful for multicast streams. In fact, load-balancing of multicast streams may increase bandwidth consumption.

Each of the issues listed above is discussed in more detail below.

As noted above, the QoS Admissions Control Signaling protocols, defined by the 802.16 draft standard and the 802.11 standard, are different. To resolve the problem, 802.11e QoS admission control messages (i.e. Add-TSpec or Delete-TSpec elements) and 802.16 QoS admission control messages (i.e. DSA, DSC, and DSD messages) are translated into common WLCCP AddStream and DeleteStream TLVs, by WiFi access points and WiMax access points, respectively, for transport over the WLCCP infrastructure. [802.16 defines a method where a station can "change" the QoS parameters for an existing QoS stream; whereas, an 802.11e station should delete and re-admit a stream to change the stream's QoS parameters. A WiMax access point can easily translate a WiMax change request into delete and admission requests, for transport over the WLCCP network.]

A QoS stream is commonly identified by an RTP Transport Address, which is comprised of the destination IP address and the destination UDP protocol port. [RSVP uses the source IP address and protocol port to identify a stream.] The RTP transport address, for a downlink stream, is derived from an 802.111e Filter-Spec element, sent to a WiFi access point, or an 802.16 classifier TLV, sent to a WiMax access point. 802.11e Filter-Spec elements and 802.16 classifier TLVs are translated into a common WLCCP FilterSpec TLV, by WiFi and WiMax access points, respectively, for transport over the WLCCP infrastructure. [The UDP port used for a QoS stream is typically negotiated when the QoS session is initiated; therefore, it is generally difficult to define static QoS filters for QoS streams.]

Ideally, a mobile station should be able to determine if a non-parent "target" access point will admit its QoS streams before it breaks the connection with its current parent access point. Two possible methods are listed below:

A first method, where a target access point autonomously determines if it can admit a mobile station's QoS streams.

A second method, where each access point registers its available bandwidth with its parent WDS and the WDS makes all admissions control decisions and tracks the remaining available bandwidth on each child access point.

Only the first method is described below. The second method is similar to the first method, except WLCCP forward handoff request messages are not forwarded to the target access point. Instead, the parent WDS of the target access point processes a forward handoff request and sends a forward handoff reply.

The existing pre-authentication and handoff protocols, specified in the 802.16 draft standard, can be consolidated into a single, common "handoff protocol" that is integrated with a radio-independent WLCCP Forward Handoff Protocol. The integrated Handoff Protocol enables a target access point to pre-admit a mobile station's QoS streams before the mobile station roams. In general, a mobile station directs an 802.16e or 802.11 handoff request message, which contains a list of QoS stream descriptors, to a target access point; the target access point returns the admission status, for each stream, in a Handoff Reply message sent to the mobile station.

In a WLCCP network, forward handoff messages are not sent directly between a mobile station and the target access point. Instead, forward handoff messages are relayed by the WLCCP network infrastructure. A mobile station attached to a WiMax (WiFi) parent access point can direct a handoff to a target WiFi (WiMax) access point because:

A handoff message, sent from/to a mobile station, and any QoS admissions control TLVs contained in the message, are translated to common WLCCP Forward-HO messages and WLCCP QoS "AddStream" TLVs for transport over the WLCCP infrastructure; and An APRID, which is a globally unique IEEE 802 address, is used to identify both WiMax and WiFi access point radios.

A mobile station's current parent access point forwards an 802.16 or 802.11 handoff request, sent by a mobile station, to the local WDS, encapsulated in a WLCCP Forward-HO Request message. The local WDS forwards the Forward-HO Request, directly or indirectly, to the respective target access point. The target access point processes the embedded AddStream TLVs and returns the admissions status, for each stream, in a Forward-HO Reply message. Forward-HO messages are forwarded as described in the section entitled "Predictive Context Forwarding".

A target access point can also return a one-time "admission ticket", which opaquely identifies a set of admitted streams, in a Forward-HO Reply message. The ticket has a limited lifetime and is authenticated with a secret key known only to the target access point. The mobile station can present the admission ticket to the target access point, no more than one time, when it roams. The target access point can quickly age and discard the mobile station's admitted streams, if the mobile station is not registered with the target access point within a short period.

It is difficult for a mobile station to communicate with a target access point, while it is attached to a different parent access point. The mobile station should first establish a security association with a target access point, prior to any other communications. A target access point may not be able to immediately respond to a QoS Admissions Control message; therefore, a mobile station may miss downlink transmissions from its parent access point while it is communicating with a target access point on a different channel.

Ideally, unicast traffic should be load-balanced across the WiMax and/or WiFi access points that cover a given area. "Available bandwidth" information can be advertised by access points, as described in the 802.11k and 802.16e draft standards, so that mobile stations can migrate to more lightly-loaded WiMax or WiFi access points. Integrated WiMax/WiFi load balancing can be used, for example, to offload an umbrella WiMax network onto WiFi overlay networks.

A wireless child access point can determine the available bandwidth on the path to the distribution network, via "path bandwidth" TLVs contained in WDS-Advertisement messages, as described above. The "available bandwidth" advertised by a wireless access point can be adjusted, as required, so that it does not exceed the available bandwidth on the uplink path to the distribution network.

Admissions control can be used to direct a mobile station, which should receive a high-bandwidth multicast stream, to an access point that is forwarding the multicast stream, so that it is not necessary for all access points in the same coverage area to forward the multicast stream. Admissions control can also be used to offload an umbrella WiMax network, by limiting high-bandwidth multicast streams (e.g. IPTV streams) to WiFi overlay networks. For example, a mobile station may send an admissions control request for an IPTV multicast stream to a parent WiMax access point. The parent WiMax access point can redirect the mobile station to a WiFi neighbor access point, which can admit the IPTV stream, by sending an admissions control reply, which includes a "reject" status and a list of neighbor access points that may admit the stream.

i. IP-to-Ethernet Bridging

The IEEE 802.16 specification defines a packet convergence layer that is used in packet-oriented networks. The 802.16 data payload in a packet-oriented network can be an Ethernet frame or an IP packet. A mobile station can negotiate the convergence sub-type, as IP or Ethernet, per 802.16 connection (by including an 802.16 "CS Specification" TLV in an 802.16 DSA-Req message). In practice, an 802.16 network will likely be either "all-IP" or "all-Ethernet".

In practice, an 802.11 infrastructure network is effectively an Ethernet network. An 802.11 access point bridges Ethernet frames to/from 802.11 mobile stations. IP-to-Ethernet bridging is required to "bridge" 802.11 access points to an all-IP WMAN. A mobile station is consistently identified by an 802 address (i.e. an Ethernet address) within a WLCCP network. To facilitate IP-to-Ethernet bridging, each access point should maintain an IP-to-Ethernet address table that contains the IP address (or IP addresses) for each mobile station. When an 802.11 access point receives an outbound IP packet, which is destined for a child mobile station, it constructs an Ethernet frame as follows:
    The destination Ethernet address is the 802 address mapped to the destination IP address.
    The source Ethernet address is an 802 address that is mapped to the home IP tunnel endpoint that provides access to the mobile station's virtual home subnet.

A mobile station's IP address can be learned by "snooping" IP packets sent by the mobile station. Alternatively, each mobile station can register its IP address via a proprietary mechanism. In one embodiment, a home tunnel endpoint "snoops" IP packets that are received from mobile station's over the corresponding IP tunnel. The home tunnel endpoint updates the co-located anchor WDS with each mobile station's IP address. The anchor WDS forwards a mobile station's IP address to the mobile station's parent access point, and any intermediate foreign WDS, when the IP address is first learned and whenever the mobile station roams.

In an all-IP network, WiMax access points only send and receive IP packets over-the-air. In that case, a mobile station, which is attached to a WiMax access point, should convert Ethernet frames into IP packets, for transmission, and received IP packets into Ethernet frames, for reception.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a mobile station operating in a multi-protocol wireless network environment that supports a first wireless communication protocol and a second wireless communication protocol wherein the network environment allows the mobile station to seamlessly roam utilizing the first and second wireless communication protocols, a method comprising:
    establishing a first link layer connection over a first radio interface using the first wireless communication protocol with a first access point, wherein the first wireless communication protocol is a short-range wireless communication protocol;
    establishing a second link layer connection over a second radio interface using the second wireless communication protocol with a second access point, wherein the second wireless communication protocol is a long-range wireless communication protocol and wherein the second link layer connection is maintained concurrently with the first link layer connection as a backup, inactive connection while the first link layer connection is available;
    presenting a common link layer interface to upper layers of a protocol stack;
    switching between the first and second wireless link layer connections for communication;
    translating between the first wireless communication protocol and the common link layer interface;
    translating between the second wireless communication protocol and the common link layer interface; and
    wherein a single link layer identifier corresponding to the mobile station is used in the first and second link layer connections; and
    wherein the switching between the first wireless link layer connection to the second wireless link layer connection comprises transmitting one or more registration messages to the second access point to cause a forwarding path associated with the mobile station to include the second access point.

2. The method as recited in claim 1 wherein the single link layer identifier is a MAC address.

3. The method as recited in claim 2 wherein the MAC address is a 48-bit IEEE 802 address.

4. The method as recited in claim 1 wherein the short-range wireless communication protocol is an IEEE 802.11 wireless communication protocol.

5. The method as recited in claim 1 wherein the long-range wireless communication protocol is an IEEE 802.16e wireless communication protocol.

6. The method as recited in claim 1 further comprising reconnecting to an available link layer connection of the first wireless communication protocol if the first link layer connection terminates; and
    reconnecting to an available link layer connection of the second wireless communication protocol if the second link layer connection terminates.

7. The method as recited in claim 1 further comprising preferentially using the short-range wireless communication protocol for active communications when the first and second connections are both established.

8. The method of claim 1 further comprising sharing, at the mobile station, security context information between the first and second link layer connections.

9. A mobile station configured to establish a first link layer connection of a first wireless communication protocol and a second link layer connection of a second wireless communication protocol, the mobile station comprises
    a first wireless network interface corresponding to the first wireless communication protocol, wherein the first wireless communication protocol is a short-range wireless communication protocol;
    a second wireless network interface corresponding to the second wireless communication protocol, wherein the second wireless communication protocol is a long-range wireless communication protocol;
    a memory;
    one or more processors;
    a first wireless network interface driver, stored in the memory, that comprises instructions configured to cause the first wireless network interface and the processor to establish the first link layer connection over a first radio interface using the first wireless communication protocol with a first access point;
    a second wireless network interface driver, stored in the memory, that comprises instructions configured to cause the second wireless network interface and the processor to establish the second link layer connection over a second radio interface using the second wireless communication protocol with a second access point, wherein the second link layer connection is maintained concurrently with the first link layer connection as a backup, inactive connection while the first link layer connection is available;

a common network interface layer, stored in the memory, that is configured to present a common link layer interface to upper layers of a protocol stack and is further configured to switch between the first and second wireless network interfaces for communication, wherein a switch between the first wireless link layer connection to the second wireless link layer connection comprises transmitting one or more registration messages to the second access point to cause a forwarding path associated with the mobile station to include the second access point; and one or more translation layers configured to translate between the first wireless communication protocol and the common network interface layer and further configured to translate between the second wireless communication protocol and the common network interface layer, wherein a single link layer identifier is used by the mobile station to connect using the first and second wireless communication protocols.

10. The mobile station as recited in claim 9 wherein the single link layer identifier is a MAC address.

11. The mobile station as recited in claim 9 wherein the short-range wireless communication protocol is an 802.11 wireless communication protocol.

12. The mobile station as recited in claim 9 wherein the long-range wireless communication protocol is an 802.16e wireless communication protocol.

13. The mobile station as recited in claim 9 wherein the common network interface layer is configured to use the first network interface as an active communications link, and to use the second network interface as a backup communications link.

14. The mobile station of as recited in claim 13 wherein the second wireless network interface driver, in the backup mode, is configured to maintain a security association with a wireless access point.

15. The mobile station of claim 9 wherein the first and second wireless network interface drivers are operative to access a shared database of security context information local to the mobile station.

16. A mobile station comprising:

means for establishing a first link layer connection over a first radio interface using a first wireless communication protocol with a first access point, wherein the first wireless communication protocol is a short-range wireless communication protocol;

means for establishing a second link layer connection over a second radio interface using a second wireless communication protocol with a second access point, wherein the second wireless communication protocol is a long-range wireless communication protocol and wherein the second link layer connection is maintained concurrently with the first link layer connection as a backup, inactive connection while the first link layer connection is available;

means for selecting the first or second wireless communication protocol for active communications, wherein the switching between the first wireless link layer connection to the second wireless link layer connection comprises transmitting one or more registration messages to the second access point to cause a forwarding path associated with the mobile station to include the second access point; and means for presenting a common link layer interface to a network protocol layer implemented in the mobile station; wherein a single link layer identifier corresponding to the mobile station is used in the first and second link layer connections.

* * * * *